United States Patent
DeLay et al.

(10) Patent No.: US 11,381,513 B1
(45) Date of Patent: Jul. 5, 2022

(54) METHODS, SYSTEMS, AND APPARATUSES FOR PRIORITY-BASED TIME PARTITIONING IN TIME-TRIGGERED ETHERNET NETWORKS

(71) Applicant: HONEYWELL INTERNATIONAL INC., Charlotte, NC (US)

(72) Inventors: Benjamin F. DeLay, Cave Creek, AZ (US); William T. Smithgall, League City, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/130,782

(22) Filed: Dec. 22, 2020

(51) Int. Cl.
*H04L 47/28* (2022.01)
*H04L 47/2425* (2022.01)

(52) U.S. Cl.
CPC .......... *H04L 47/28* (2013.01); *H04L 47/2433* (2013.01)

(58) Field of Classification Search
CPC .......................... H04L 47/28; H04L 47/2433
See application file for complete search history.

(56) References Cited

U.S. PATENT DOCUMENTS

| | | | |
|---|---|---|---|
| 8,503,484 B2 | 8/2013 | Bonk et al. | |
| 8,634,305 B2 * | 1/2014 | Smithgall | H04L 43/50 370/241 |
| 10,652,044 B2 | 5/2020 | Mangin | |
| 2016/0294697 A1 * | 10/2016 | Varadarajan | H04L 47/28 |
| 2016/0294720 A1 | 10/2016 | Varadarajan et al. | |
| 2016/0294721 A1 * | 10/2016 | Varadarajan | H04L 41/0869 |
| 2019/0289616 A1 | 9/2019 | Hampel et al. | |

FOREIGN PATENT DOCUMENTS

| | | |
|---|---|---|
| CN | 107241179 A | 10/2017 |
| CN | 109587077 A | 4/2019 |
| CN | 110601997 A | 12/2019 |
| CN | 110661589 A | 1/2020 |

OTHER PUBLICATIONS

Pahlevan, Maryam, et al., "Genetic Algorithm for Scheduling Time-Triggered Traffic in Time-Sensitive Networks," downloaded from https://networked-embedded.de/paper/pahlevan-etfa-2018.pdf on Nov. 9, 2020.

(Continued)

*Primary Examiner* — Jung H Park
(74) *Attorney, Agent, or Firm* — Lorenz & Kopf, LLP

(57) ABSTRACT

Methods, systems, and apparatuses for scheduling a plurality of Virtual Links (VLs) in a Time-Triggered Ethernet (TTE) network by determining a subset of a group of bins allocated to TT traffic; restricting the subset bin groups to a specified harmonic subdivided pattern with a certain duration; allocating the subset of bin groups in accordance with bin group equated with a rate at least twice as high as a highest TT traffic rate available in the network to enable control of partitioned traffic by using a set of media reservations; checking whether a bin selected via a bin selection process for scheduling a TT Virtual Link (VL) is a valid TT bin, else proceeding to a subsequent bin until a valid TT bin is returned for the TT VL, and reserving using at least one media reservation for a TT VL to be scheduled by temporal partitioning at the restricted rate.

18 Claims, 6 Drawing Sheets

(56) References Cited

OTHER PUBLICATIONS

Starke, A. et al., "A Test Bed Study of Network Determinism for Heterogeneous Traffic Using Time-Triggered Ethernet," downloaded from https://par.nsf.gov/servlets/purl/10073109 on Nov. 9, 2020.

Delay, Benjamin, et al., U.S. Appl. No. 16/867,628, filed May 6, 2020.

Delay, Benjamin, et al., U.S. Appl. No. 16/554,128, filed Aug. 28, 2019.

Delay, Benjamin, et al., U.S. Appl. No. 16/554,210, filed Aug. 28, 2019.

Delay, Benjamin, et al., U.S. Appl. No. 16/554,280, filed Aug. 28, 2019.

Steiner, Wilfried, et al., "Mixed-Criticality Networks for Adaptive Systems," Digital Avionics Systems Conference (DASC), 2010 IEEE/AIAA 29th, Oct. 3, 2010, pp. 5 A.3-1-5.A3-10.

Suethanuwong, Ekarin, "Scheduling Time-Triggered Traffic In TTEthernet Systems," Proceedings of 2012 IEEE 17th International Conference on Emerging Technologies & Factory Automation (ETFA 2012), Sep. 17, 2012, pp. 1-4.

\* cited by examiner

METHODS, SYSTEMS, AND APPARATUSES FOR PRIORITY-BASED TIME PARTITIONING IN TIME-TRIGGERED ETHERNET NETWORKS

CROSS-REFERENCE TO RELATED APPLICATIONS

The subject matter described here is related to the subject matter described in U.S. patent application Ser. No. 17/130,624 entitled "METHODS, SYSTEMS, AND APPARATUSES FOR ENHANCED PARALLELISM OF TIME-TRIGGERED ETHERNET TRAFFIC USING INTERFERENCE-COGNIZANT NETWORK SCHEDULING," filed concurrently herewith.

TECHNICAL FIELD

The present disclosure generally relates to methods, systems, and apparatuses for scheduling in Time-Triggered Ethernet (TTE) networks, and more particularly to data flows and functionality to temporally partition multiple classes of Time-Triggered (TT) traffic from remainder TT traffic on the TTE network, to employ global reservations in switches in multiple traffic classes.

BACKGROUND

The growing data needs of TTE networks have stressed the implementation of current algorithms, and these algorithms regularly fail to converge on a valid global schedule for proper traffic throughput in the TTE network. The TTE network is based on routing ethernet frames through isolated data tunnels referred to as Virtual Links (VLs). The VLs are multicast trees, each tree enabling data transmission between one and only one end of the TTE network to several other ends. When using multiple VLs deployed for exchanging data within and between avionics systems, the multiple VLs are deployed with a reserved amount of bandwidth. The design of the VLs enables data exchanges between partitions located on different modules that require tunneling through VLs in which a dedicated VL is configured for each communication flow. For efficient tunneling, a selection of particular transmission parameters is required that affects the overall timing properties and the bandwidth allocation of the VL and enables a path between the source (producer) and the receivers.

To schedule each VL, the scheduling algorithm of the NST sorts the VLs based on transmit rate, size, and latency constraints. For each rate, the tightest-constrained VLs are scheduled first. This approach may assume that rate and latency requirements track closely and inversely. Still, data sets have since been presented to the algorithm that exhibits many instances of low-rate, low-latency data, violating these basic assumptions. These data sets are difficult to schedule with the current algorithmic approaches to time slot selection, and scheduling attempts fail to produce a valid network schedule with all requested VL traffic included.

The variability in packet timing for each TT VL necessitates excessive "dead band" time in the bins for each VL in the TTE network. For example, sources of variability of the packet timings may include network synchronization precision and shuffle time. The shuffle time is the delay that a scheduled TT packet may encounter at an end system egress port or a switch hop in which a lower-priority unscheduled packet has begun transmission on a common physical egress port just prior to a TT packet arriving at a conflicted egress queue. Because of the shuffle time delay, it necessitates the scheduling algorithm to assume or be implemented with a full-size Ethernet frame delay at each switch hop along a TT packet's network route, which contributes to the amount of "dead band" time contained in the bins. To alleviate this assumed delay in scheduling algorithms, it is desirable to use an enhanced priority-based media reservation schema to eliminate the possibility of a shuffle conflict occurring at the egress end system. It is also desirable to employ a global reservation in the switches of the TTE networks.

Hence, there is a need for methods, systems, and apparatuses for scheduling in TTE networks to reduce dead-band time, to increase a Network Scheduler Tool (NST) performance by allocating exclusive access to TTE network resources by implementing a priority-based global reservation feature in an NST scheduling algorithm.

Other desirable features and characteristics will become apparent from the subsequent detailed description and the appended claims, taken in conjunction with the accompanying drawings and the foregoing technical field and background.

BRIEF SUMMARY

Methods, systems, and apparatuses are provided for scheduling a plurality of VLs in a TTE network.

In an exemplary embodiment, a method of scheduling Time-Triggered (TT) traffic by a Network Scheduling Tool (NST) in a TT Ethernet (TTE) network is provided. The method includes determining, by the NST, a subset of a group of bins allocated to TT traffic wherein the TT traffic is restricted in a specified harmonically subdivided pattern with a certain duration; equating, by the NST, an allocated group of bins to a rate which is restricted to a rate that is at least twice as high as a highest TT traffic rate to enable controlling of media reservations; checking, by the NST, whether a bin selected for a TT Virtual Link (VL) via a bin selection process is a valid TT bin, else proceeding to a subsequent bin until a valid TT bin is returned for the TT VL; and in response to a TT schedule established by selection of valid TT VLs, configuring by the NST by a scheduling algorithm, approximately all TTE capable network devices to activate a media reservation wherein the media reservation restricts runtime egress packet processing to packets with a priority greater than or equal to a TT priority.

In at least one embodiment, the method includes placing, by the NST, at least one trigger for at least one media reservation approximately one full shuffle time period prior to a beginning of each valid TT bin to be scheduled wherein at least one media reservation is cleared at an end of each valid TT bin.

In at least one embodiment, the method includes placing, by the NST, at least one trigger for a media reservation approximately one full shuffle time period prior to the beginning of each valid TT bin to be scheduled wherein the media reservation is cleared at the last transmit of a TT VL in each valid TT bin.

In at least one embodiment, the method includes placing, by the NST, at least one trigger for a media reservation approximately one full shuffle time period prior to the beginning of a contiguous set of valid TT bins wherein the media reservation is cleared at an end of the contiguous set of valid TT bins.

In at least one embodiment, the method includes placing, by the NST, at least one trigger for a media reservation approximately one full shuffle time period prior to the beginning of a contiguous set of valid TT bins wherein the media reservation is cleared at a last transmit of a TT VL in the contiguous set of valid TT bins.

In at least one embodiment, the method includes preventing, by the NST, lower priority traffic from interference in network transit of TT traffic by a set of media reservations.

In at least one embodiment, the method includes removing, by the NST, variability introduced by dead-band time that had been previously allocated to a VL to be scheduled.

In at least one embodiment, the method includes assigning, by the NST, TT bins to be scheduled without shuffle time for interference with synchronization protocol control frames (PCFs) being active while TT traffic navigates the network.

In at least one embodiment, the method includes removing, by the NST, other variability caused by allowing lower-priority traffic to traverse the network during the same time that TT traffic is scheduled in a global schedule, thereby allowing TT traffic in transit to be spaced closely together in the global schedule.

In at least one embodiment, the method includes dispatching, by the NST, a plurality of scheduled rate constrained (SCHRC) packets of a pseudo-class of traffic from end systems and switches in the network using a set of synchronized schedule triggers to process the SCHRC pseudo-class of traffic contained outside of TT bins in the network wherein the plurality of SCHRC pseudo-class of traffic is treated as Rate Constrained (RC) traffic at an initial switch hop ingress and subsequent switch hops in transit to a receiving end system.

In another exemplary embodiment, a system for scheduling a set of Virtual Links (VLs) contained in a Time-Triggered (TT) Ethernet (TTE) network with temporal partitioning by a Network Scheduling Tool (NST) is provided. The system includes the NST configured to: determine a subset of a group of bins allocated to TT traffic wherein the TT traffic is restricted in a specified harmonically subdivided pattern with a certain duration; equate an allocated group of bins to a rate which is restricted to a rate that is at least twice as high as a highest TT traffic rate to enable controlling of media reservations; and check whether a bin selected for the TT VL via a bin selection process is a valid TT bin, else proceeding to a subsequent bin until a valid TT bin is returned for the TT VL.

In at least one embodiment, the system includes the NST further configured to: in response to a TT schedule established by selection of a set of valid TT VLs, activate approximately all TTE capable network devices with a media reservation wherein the media reservation restricts runtime egress packets in transit to a set of runtime egress packets with a priority higher than or equal to a TT priority of the network.

In at least one embodiment, the system includes the NST further configured to: place at least one trigger for the media reservation approximately one full shuffle time period prior to a beginning of each TT bin, wherein the media reservation is cleared at an end of each TT bin.

In at least one embodiment, the system includes the NST further configured to: place at least one trigger for the media reservation approximately one full shuffle time period prior to a beginning of each TT bin, wherein the media reservation is cleared at the last TT VL transmit of each TT bin.

In at least one embodiment, the system includes the NST further configured to: place at least one trigger for the media reservation approximately one full shuffle time period prior to a contiguous set of TT bins wherein the media reservation is cleared at the end of the contiguous set of TT bins.

In at least one embodiment, the system includes the NST further configured to: place at least one trigger for the media reservation approximately one full shuffle time period prior to a contiguous set of TT bins wherein the media reservation is cleared at the last TT VL transmit of the contiguous set of TT bins.

In at least one embodiment, the system includes the NST further configured to: prevent lower priority traffic from interfering with TT transmissions by placing at least one media reservation of a TT bin approximately one full shuffle time period prior to a start of each TT bin.

In at least one embodiment, the system includes the NST further configured to: remove variability that has been introduced by dead-band time allocated to a VL to be scheduled in the network; and assign a set of TT bins to be scheduled without shuffle time for interference with synchronization protocol control frames (PCFs) being active while TT traffic navigates the network.

In at least one embodiment, the system includes the NST further configured to: dispatch scheduled rate constrained (SCHRC) packets of a pseudo-class of traffic dispatched from end systems and switches using synchronized schedule triggers placed outside of TT bins and by treatment of SCHRC pseudo-class of traffic as RC traffic at an initial switch hop ingress and at subsequent switch hops on route to a receiving end system.

In yet another exemplary embodiment, an apparatus including a network scheduling tool (NST) for scheduling of Virtual Links (VLs) contained in a Time-Triggered Ethernet (TTE) network for use by a Network Scheduling Tool (NST) is provided. The apparatus includes the NST configured with a processor programmed by a set of instructions to schedule time-triggered traffic by: determining a subset of a group of bins allocated to TT traffic wherein the TT traffic is restricted in a specified harmonically subdivided pattern with a certain duration; equating an allocated group of bins to a rate which is restricted to a rate that is at least twice as high as a highest TT traffic rate to enable controlling of media reservations; checking whether a bin selected for a TT virtual link (VL) via a bin selection process is a valid TT bin, else proceeding to a subsequent bin until a valid TT bin is returned for the TT VL; and in response to a TT schedule established by selection of valid TT VLs, configuring by the NST by a scheduling algorithm, approximately all TTE capable network devices to activate a media reservation wherein the media reservation restricts runtime egress packet processing to packets with a priority greater than or equal to a TT priority.

In at least one embodiment, the apparatus includes the NST configured with a processor programmed by a set of instructions to schedule time-triggered traffic by: placing at least one trigger for the media reservation approximately one full shuffle time period prior to a beginning of each TT bin or contiguous set of TT bins wherein the media reservation is cleared at an end of each TT bin or the contiguous set of TT bins.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
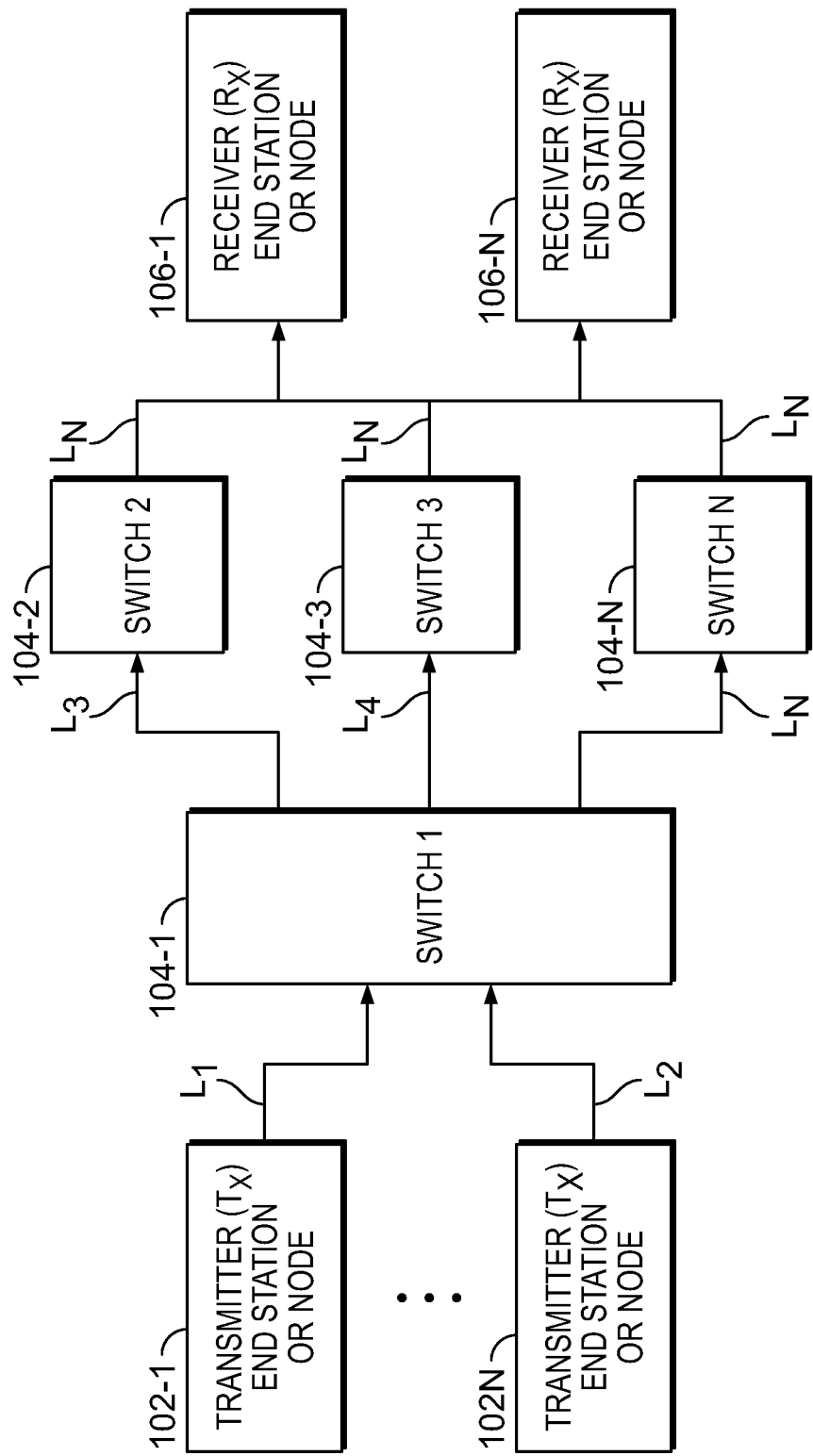
FIG. 1 is a functional block diagram illustrating one embodiment of an exemplary network in accordance with exemplary embodiments.

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, summary, or the following detailed description.

In various exemplary embodiments, the present disclosure describes methods, systems, and apparatuses for additional data flows and functionality to temporally partition TT traffic from the remainder of the traffic on the network, including synchronization traffic using Protocol Control Frames (PCFs), Rate-Constrained (RC) traffic, and Commercial-Off-The-Shelf/Best-Effort (COTS/BE) traffic.

In various exemplary embodiments, the present disclosure describes methods, systems, and apparatuses' use of a global network timeline divided into bins and the determining by input to scheduling algorithm of subsets of the bins to be allocated exclusively to TT traffic. The bins available to be allocated to TT traffic can be specified in any harmonically subdivided pattern with the restriction that the duration of each bin must equate to a rate that is twice as high as any TT rate in the system. This restriction is necessary due to the control of the media reservations. This process can also be employed at a finer granularity than the bin level, in which a configurable percentage of a bin's time can be devoted only to TT traffic. Also, this implementation may prove useful for systems with many lower-speed end-system devices (e.g., devices with 10 Mbps or 100 Mbps connections).

In various exemplary embodiments, the present disclosure describes methods, systems, and apparatuses to enable temporal partitioning of traffic classes that simplify memory buffer management in network switches and provides analysis and verification for tooling. The TT traffic in the scheduling algorithm is forwarded as RC traffic when departing network switches to enable sharing of TT and RC frames in the same buffer allocation pool. With the temporal partitioning, any consideration is obviated for interference between TT and RC frames in the switch memory pools because adequate partitioning and RC traffic policing guarantees that all RC frames have egressed from the switch before enabling the media reservation for the TT traffic.

In various exemplary embodiments, the present disclosure describes methods, systems, and apparatuses' execution of the scheduling algorithm wherein the NST determines whether a selected bin using a specified bin selection process is identified as a valid TT bin. If this is not the case, then the selected bin is skipped forthwith, and the process proceeds to the next returned (or consecutive) bin for identifying by the specified bin selection process. The process continues until a valid bin is identified for placement of the TT VL. Once the TT schedule is established, the scheduling algorithm configures all TTE-capable network devices to activate the media reservation feature. The media reservation feature is configured to restrict a runtime egress packet process to packets associated with priorities that are greater than or equal to the TT priority. The restriction prevents lower-priority traffic from interfering with a TT packet's network transit, and the variability introduced by shuffle times can be removed completely from the "dead band" time allocated to the VL. Additionally, TT bins can be assigned such that no interference with the synchronization PCF traffic takes place while TT traffic is flowing through the network. This removes another source of variability and allows TT traffic to be spaced more closely together in the global schedule In various exemplary embodiments, the present disclosure describes methods, systems, and apparatuses that place the media reservation triggers one full shuffle time prior to the beginning of each TT bin or contiguous set of TT bins, and the media reservation is cleared at the end of each TT bin or contiguous set of TT bins. Various optimizing embodiments include offsetting the media reservation commands on egress switch ports to take advantage of serialization delays from transmitting end systems, clearing the media reservation on client end system devices after the completion of all TT transmit events instead of waiting until the end of the contiguous set of TT bins, or other sub-bin timing optimizations.

In various exemplary embodiments, the present disclosure describes methods, systems and apparatuses that after the TT schedule is established, the scheduling algorithm configures all TTE-capable network devices to activate the media reservation feature. Media reservation is a feature that restricts runtime egress packet processing to packets with priorities greater than or equal to the TT priority. Therefore, no lower-priority traffic can interfere with a TT packet's network transit, and the variability introduced by shuffle times can be removed completely from the "dead band" time allocated to the VL. Additionally, TT bins can be assigned such that no interference with the synchronization PCF traffic takes place while TT traffic is flowing through the network. This removes another source of variability and allows TT traffic to be spaced more closely together in the global schedule.

In use, in TTE networks, there are three types of traffic classes configured for TTE network traffic besides Time-Triggered (TT) traffic, which are as follows: Synchronization Traffic (Protocol Control Frames—PCF) in which the TTE network uses protocol control frames (PCFs) to maintain synchronization. The PCFs traffic has the highest priority, and it is similar to rate-constrained (RC) traffic. RC traffic is Ethernet packets configured to keep maximum latency and jitter in a closed system with less stringent determinism and real-time requirements. RC traffic guarantees that bandwidth is predefined for each application, and delays and temporal deviations have defined upper bounds. BE Traffic is sent via First-in First Out (FIFO) queues to egress ports. BE traffic utilizes any remainder bandwidth of the TTE network is designated with a lower priority.

In an exemplary embodiment, egress filtering is restricting by rate or by protocol traffic in transit from an internal or external network to another network.

The scheduler operates by creating the smallest set of identically sized bins whose length in time are harmonic to all the scheduled rates in the target network and allows end-to-end traversal of a full-sized TT frame based on the breadth of the configured network. It then duplicates these bin sets and schedules traffic for each rate group (of multiple classes) in order from fastest to slowest.

In various exemplary embodiments, the present disclosure implements improved enhancements to NST for scheduling TTE networks. These approaches have been shown to alleviate scheduling difficulties encountered when scheduling data using the baseline implementation. This allows for a significant performance increase in the existing scheduler logic by analyzing and utilizing additional information in the input data set to inform downstream scheduling decisions, providing system designers additional input to control the behavior of the search algorithms, or by creating a dynamic scheduling algorithm based on novel approaches in machine learning shown to be effective for optimization problems.

The embodiments described below enable an improved network scheduling tool (NST) to more efficiently utilize the underlying network hardware's features and capabilities, such as improving network performance for such measures as latency, interference, etc. For example, the embodiments described below enable improved slot time allocation and improved traffic management. Thus, when implemented by the underlying hardware, the schedule and configuration parameters generated by embodiments of the NST described herein result in improved network performance. The various features of the NST described herein can be used together or individually depending on the features and capabilities of the underlying network hardware.

In various exemplary embodiments, the present disclosure describes methods, systems, and apparatuses where media reservation triggers are placed one full shuffle time prior to the beginning of each TT bin or contiguous set of TT bins, and the media reservation is cleared at the end of each TT bin or contiguous set of TT bins. Various optimizing embodiments include offsetting the media reservation commands on egress switch ports to take advantage of serialization delays from transmitting end systems, clearing the media reservation on client end system devices after the completion of all TT transmit events instead of waiting until the end of the contiguous set of TT bins, or other sub-bin timing optimizations In various exemplary embodiments, the present disclosure describes methods, systems, and apparatuses with Scheduled Rate Constrained (SCHRC) pseudo-class of traffic that is dispatched from end systems or switches using synchronized schedule triggers but is treated as RC traffic at the first switch hop ingress as well as all subsequent hops and the receiving end system. The time partitioning algorithm takes into account the valid TT bins and schedules all SCHRC traffic with the other RC traffic flows.

In various exemplary embodiments, the scheduling algorithm sorts the VLs based on transmit rate, size, and latency constraints. For each rate, the tightest-constrained VLs are scheduled first. The algorithms were initially designed to assume that rate and latency requirements track closely and inversely. Still, data sets have since been presented to the algorithm that exhibits many instances of low-rate, low-latency data, violating these basic assumptions. These data sets are difficult to schedule with the original algorithmic approaches to time slot selection, and scheduling attempts fail to produce a valid network schedule with all requested VL traffic included.

The U.S. patent application Ser. No. 16/554,280 assigned to Honeywell International Inc., Morris Plain, N.J. (US) is incorporated by reference and provides methods, systems, and apparatuses for optimizing the bin selection of a network scheduling and configuration tool (NST) by bin allocation, demand, prediction, and machine learning.

The issued U.S. Pat. No. 9,762,501 B2 to Varadarajan et al. also assigned to Honeywell International Inc., Morris Plain, N.J. (US), is incorporated by reference and provides systems and methods for systematic hybrid network scheduling for multiple traffic classes with host timing and phase constraints using a method of scheduling communications in a network that includes scheduling transmission of VLs pertaining to a first traffic class on a global schedule. In addition, to coordinate transmission of the Virtual Links pertaining to the first traffic class across all transmitting end stations on the global schedule. Also, the scheduling of transmission of each VL pertaining to a second traffic class on a local schedule of the respective transmitting end station from which each respective VL pertaining to the second traffic class is transmitted where the transmission of each VL pertaining to the second traffic class is coordinated only at the respective end station from which each respective VL pertaining to the second traffic class is transmitted.

FIG. 1 is a block diagram of one embodiment of an exemplary network 100. The network 100 includes a plurality of end stations 102 and 106 (also referred to herein as "nodes") and a plurality of switches 104. As used herein, both switches and end stations can be referred to as nodes. Node 102 is designated as a transmission node, and nodes 106-1 . . . 106-N are designated as reception nodes to which a transmitted message from the end station (or node 102) is directed. As used herein, a 'Virtual Link (VL)' defines traffic flow from a single transmitting end station (or node 102) to one or more reception nodes 106. For example, a VL may refer to a VL as defined in ARINC 664 part 7. In addition, as used herein, a 'network plane' refers to a disjoint or distinct path from a single transmitting port in a transmitting node 102 to the one or more reception nodes 106 of the Virtual Link. Since all paths in FIG. 1 from the transmitting node 102 to the reception nodes 106-N include a switch 104-1, FIG. 1 depicts only a single network plane. Although FIG. 1 only depicts a single network plane for purposes of explanation, it is to be understood that multiple network planes can be included in network 100 to provide data path redundancy in other embodiments.

The network 100 can be implemented using suitable hardware and protocols which can be configured to support one or more of the functions described herein. For example, the embodiments described herein are implemented using the TTE protocol and compatible hardware as defined in the SAE AS6802 standard for purposes of explanation. However, it is to be understood that other hardware and protocols can be used in other embodiments. For example, other exemplary network implementations include, but are not limited to, ethernet-based networks, including Avionics Full-Duplex Switched (AFDX) Ethernet defined in the ARINC 664 Part 7 standard and non-Ethernet based store and forward networks. As used herein, the ethernet refers to the family of protocols defined in the IEEE 802.3 standard. Also, it is to be understood that multiple network protocols can be used together in some embodiments. For example, in some embodiments, a Network Scheduling and Configuration Tool (referred to herein as NST) is configured to enable scheduling a TTE schedule on top of an already existing AFDX schedule, thereby integrating or combine the schedules.

The NST is used to schedule transmission of messages (also referred to herein as frames) through network 100 and determine other configuration parameters for the operation of network 100. The NST need not be one of the end stations 102, 106, or switches 104 in network 100.

Figure 2:
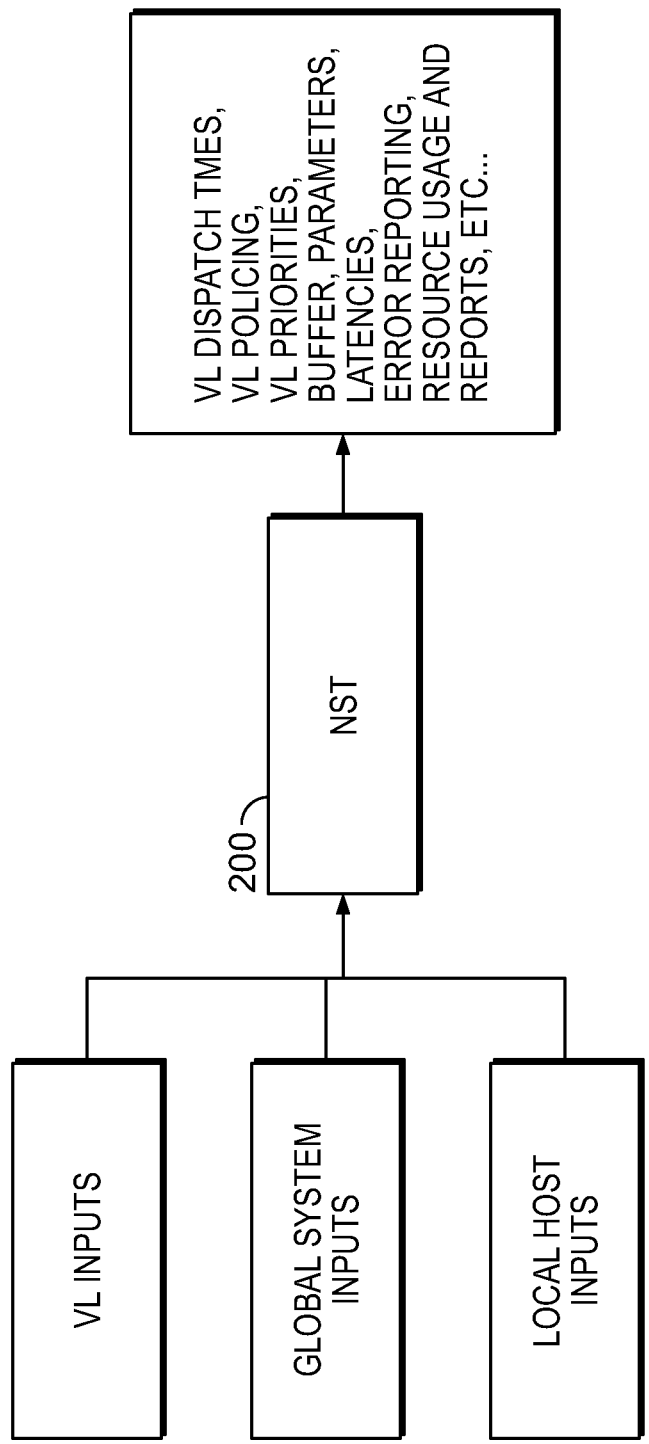
FIG. 2 is a functional block diagram illustrating the use of embodiments of the network scheduling and configuration tool (NST) in accordance with exemplary embodiments.

FIG. 2 depicts exemplary inputs for use by embodiments of the NST 200 and exemplary schedule and configuration parameters output by the NST 200. In particular, the exemplary inputs include VL inputs, global system inputs, and localhost inputs. The VL inputs for each VL can include the VL identification number, the source network interface card (NIC) (i.e., end stations 102 and 106), the set of reception nodes, routing information, payload size, traffic class, transmit rate, and schedule type of a fast pass or a normal pass scheduling. The fast pass scheduling, also called sub-period scheduling, attempts to schedule a VL transmission after the producer has written the VL into the egress buffer. Before the earliest consumer expects to read the VL from the ingress buffer, guaranteeing a network latency less than the VL period. The normal pass scheduling, also called super-period scheduling, attempts to schedule a VL transmission after the latest consumer has read the VL from the ingress buffer. Before the producer expects to produce a new sample of the VL, guaranteeing a network latency is more significant than the VL period.

The global system inputs can include information regarding synchronization flows between timing masters and compression masters as defined in SAE AS602, and system configuration constants (e.g., precision constant, inter-frame gap (IFG), etc.). The local host inputs can include producer or transmitting node write frame rate, producer time frame offset definition, consumer or reception node read frame rate, consumer time frame offset definition, producer buffer, and consumer buffer models (e.g., single transmit buffer, VL queue, direct memory access (DMA), First-in-First-out, etc.) Details regarding exemplary local host inputs are described in more detail below.

The exemplary output scheduling and configuration parameters can include VL dispatch times, VL policing parameters, VL priorities, buffer parameters, latencies, error reporting, resource usage, reports, etc. For example, the NST 200 can calculate the schedule for VL dispatch times and arrival windows based on message rates and timing constraints. Additionally, the NST 200 can set bandwidth allocation gap (BAG) for bandwidth policing per ARINC 664, policing (jitter) values, assign VL priorities based on rates, determine buffer types and size allocations in end stations and switches, determine resource usage and reports (such as but not limited to, link utilizations, time slots spare efficiency, buffer utilization, etc.), and provide error and warning reports (such as but not limited to schedulable actions, buffer overruns, etc.) The NST 200 can also determine end-to-end data latencies and jitter between end stations and provide timing reports for a global timeline and a local timeline for every switch and end station dispatch port. Additional details regarding the schedule and configuration parameters output by the NST 200 are described in more detail below.

Figure 3:
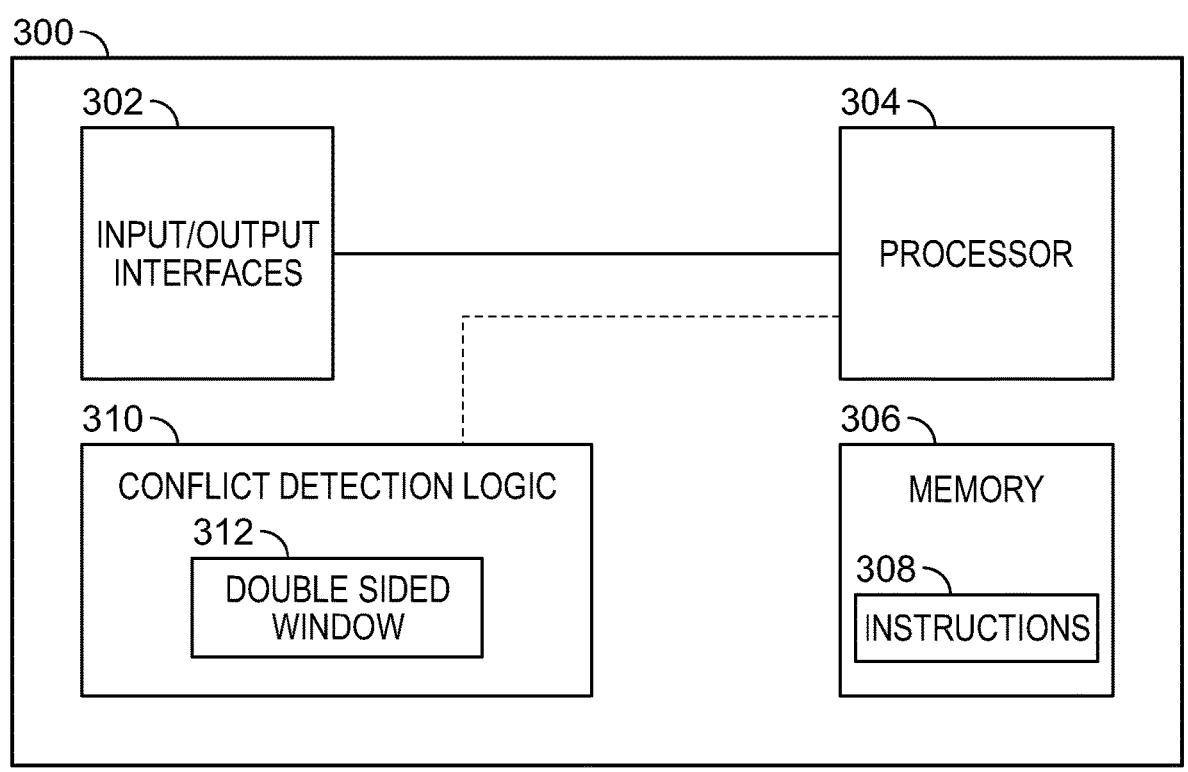
FIG. 3 is a functional block diagram illustrating components of an exemplary NST in accordance with exemplary embodiments.

FIG. 3 illustrates a processing unit, memory, and interface of an exemplary NST in accordance with an embodiment. The NST 300 includes an input/output interface 302, a processing unit 304, and a memory 306. Network scheduling instructions 308 are stored in memory 306. The processing unit 304 includes or functions with software programs, firmware, or other computer-readable instructions (e.g., network scheduling instructions 308) for carrying out various methods, process tasks, calculations, and control functions, used in performing the functions described herein, such as scheduling the multiple classes of frames.

These instructions are typically stored on any appropriate computer-readable medium used to store computer-readable instructions or data structures. The computer-readable medium can be implemented as any available media that can be accessed by a general-purpose or special-purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read-Only Memory (ROM), Electrically Erasable Programmable ROM (EEPROM), flash memory, Solid State Drives (SSD), etc.

By executing the network scheduling instructions 308, the processing unit 304 computes network configuration and scheduling tables, output via the input/output interface 302. The network scheduling instructions 308 are configured to cause the processing unit 304 to implement some or all of the techniques described herein to compute the configuration and schedule tables. The configuration and schedule tables can be loaded into the various nodes (e.g., end stations and switches) of the network for managing the frames that flow through the network. Hence, the NST 300 need not be implemented as a node in the network.

The NST includes conflict detection logic 310 with a double-sided timing window 312 for resolving a physical resource conflict between the VL that is scheduled and each VL already scheduled in the bin.

For example, the configuration and scheduling tables allow both Rate Constrained (RC) and Time-Triggered (TT) scheduling parameters of the AS6802 and the ARINC 664 part 7 protocols. That is, a controlled traffic frame arriving at an input port of a switch, for example, may be transmitted from a dispatch/output port of the switch using the TT scheduling protocol on some output ports and the RC scheduling protocol on other ports, regardless of how the arriving frame was classified on arrival at the input port. In other words, the frame may arrive at the input port as a TT or RC frame. Additionally, the pattern used to determine the class of an arriving frame is configurable. For example, the same frame may be classified differently in different network units. The same frame may be classified differently at a Tx ES than at a switch or a receiving end station (Rx ES). Different physical links in a VL routing tree can be configured to handle the same frame using different traffic classes. The NST configuration may ensure the desired performance for the TT and RC classes for critical traffic. Also, the NST 300 accommodates Best-Effort (BE) traffic, typically used for non-critical traffic, by allowing a network medium to be shared with safety-relevant traffic flows. The traffic classes supported by the NST are discussed in more detail below.

Multi Rate, Multi Criticality Traffic Scheduling

The NST 300 supports multiple classes of messages. In some embodiments, the traffic class for each respective message or frame is derived from or is a function of the addressing scheme. That is, the traffic class can be based on the VL identification (ID) or destination address. In some embodiments, the NST 300 supports the simultaneous scheduling and configuration of a TT message class, an RC message class, and a BE message class implemented by the underlying network hardware.

TTE integrates traffic of different time-criticality levels into one physical network. The three traffic classes in TTE corresponding to the time-criticality levels. The classes, ordered by decreasing priority of the Time-Triggered (TT), Rate-Constrained (RC), and Best-Effort (BE) traffic. A so-called temporal firewall or partition is employed for the separation of the traffic. The TT messages are sent over the network 100 at predefined times and have a higher priority than RC and BE message types. The occurrence, temporal delay, and precision of TT messages are predefined and guaranteed. The messages have as little delay on the network as possible, and their temporal precision is as accurate as needed based on system configuration. For example, TT messages are tightly coupled to a global timeline or schedule. As used herein, the global timeline refers to a system-wide clock or notion of time, whereas a local timeline refers to the local time maintained by each node. Thus, the dispatch of TT frames, which are tightly coupled, are tied to the global timeline through each transmitting node and switch. Additionally, as used herein, the term 'tightly coupled' means that the transmitting node's dispatch times and switches between the transmitting node and reception nodes are tied to a global timeline. Additionally, it is to be understood that the terms 'timeline' and 'schedule' can be used interchangeably herein.

The RC messages can be used for applications with less strict determinism and real-time requirements than TT messages. The RC messages are guaranteed bandwidth predefined for each application with delays and temporal deviations that have predefined limits. Asynchronous traffic falls within this class. The bandwidth, i.e., payload bytes per period/rate, is guaranteed with a bounded delay/latency to arrive at the receiver, and traffic is not tightly coupled to the global timeline. Thus, in contrast to TT messages, the dispatch times of RC frames, which are not tightly coupled, are not tied to the global timeline but have a bounded window for delivering the frame to the reception nodes.

The BE messages are transported through the network according to conventional Ethernet policy. BE messages are not guaranteed bandwidth, transmit times, limits on maximum delay, or whether the BE messages arrive at the receiver. Essentially, BE messages use the remaining bandwidth of the network after accounting for TT and RC messages and have lower priority than the other two classes of messages.

In some embodiments, the RC messages (also referred to herein as RC frames) satisfy the ARINC specification 664 part 7. The RC frames are queued at dispatch ports (e.g., output ports) in transmitting end stations (TxES) (e.g., node 102) and/or in switches (104-1 . . . 104-N). The RC frames are transmitted according to a priority found in a configuration table computed by the NST 300. In some embodiments, up to eight priority levels are supported by the NST 300.

The RC frames may be policed on arrival at input ports in a switch. For example, the frames can be policed to enforce either rate control in packets per second or bandwidth enforcement in bytes per second. For example, in some embodiments, a token-bucket configured with period and jitter bounds are used. Token-buckets are known to one of skill in the art and, thus, are not described in more detail herein. In some embodiments, the switches are configured to support a fixed number of policing accounts (e.g., each VL being policed is a policing account). For example, in implementations involving AFDX, each VL is monitored at an input port to determine if the number of frames per period complies with the BAG.

The TT messages (also referred to herein as TT frames) are transmitted with a period and offset found in a schedule configuration table with respect to a global timeline. In some embodiments, multiple configurable periods having different respective values can be supported. For example, up to 8 different periods (rates) for TT messages are supported in some embodiments. In such embodiments, the specific value for each of the 8 periods is configurable. Alternatively, the specific values for more than 8 periods may also be configurable.

Scheduled Rate Constrained Traffic Class

In addition to the traffic classes discussed above, a scheduled rate constrained (SCHRC) "logical" traffic class is created by the NST 300 using TT and RC mechanisms supported by the network hardware, in some embodiments. That is, in calculating the schedule and configuration tables, the NST 300 accounts for SCHRC frames. Handling or scheduling of an SCHRC frame can be considered a hybrid between handling a TT frame and handling a pure RC frame. In particular, whereas TT frames are scheduled on a global timeline, SCHRC frames are scheduled on a local timeline of the respective Tx ES, where the local timeline need not be tied to the global timeline. For example, the same rates/period allowed for TT traffic schedules are also allowed for SCHRC traffic schedules. Additionally, SCHRC VL frames mimic TT VL frames when being scheduled and dispatched from a Tx ES. That is, the SCHRC frames have the same priority as a TT frame when scheduled for dispatch from a Tx ES. However, SCHRC VL frames flow through the $1^{st}$, $2^{nd}$, $3^{rd}$, etc. hop switches to the corresponding Rx ES as an RC frame with lower priority than a TT frame.

Configuration Paradigms

In some embodiments, the routing tables created by the NST 300 configure only the first switch hop to enforce RC BAG/Jitter policies on arrival at the input port. Enforcement of the BAG/jitter policies is disabled at subsequent second hop switches, third hop switches, etc., in such embodiments. The NST 300 can disable BAG/jitter policies for subsequent switches based on the knowledge that the switches are high integrity and fail-passive in some embodiments. Hence, the protection provided by the first hop is sufficient for such implementations.

The reserve media option reserves a period of time prior to the scheduled transmission time of the TT frame such that other frames are not transmitted during the reserved period of time. In this way, the TT frame does not have a conflict with another frame at the scheduled transmission time. Thus, in the first configuration option, the TT VL is configured as a TT class of traffic at the dispatch port of the transmitter end station (Tx ES) 102 with the reserve media option enabled and a shuffle time penalty not assumed. Similarly, at each of the switches 104-1 . . . 104-4, the TT VL is configured as a TT class of traffic at the dispatch port of the switches 104 with the reserve media option enabled and a shuffle time penalty not assumed. Thus, the shuffle penalty is not assumed at each of the switches 104. At the input ports of the first switch hop 104-1, the TT VL is configured as a TT class of traffic, and an arrival policing window (e.g., the earliest time of arrival and latest time of arrival) is enforced.

At the input ports of the subsequent switch hops (e.g., switch 104-2, 104-3, and 104-N), the TT VL is configured as RC traffic having the highest available RC class priority (e.g., RC6). The subsequent switches 104-2, 104-3, and 104-N are not configured to enforce BAG or jitter policies. At the input ports of the corresponding receiver end stations (Rx ES) (e.g., Rx ES 106-1 . . . 106-N), the TT VL is configured as a TT class of traffic, and each corresponding Rx ES is configured to perform TT redundancy management.

The NST 300 configures the switch routing tables for routing each TT VL from an input port to one or more output/dispatch ports at every switch between the transmitter end stations (Tx ES) and the Rx ESs, for one or more network planes, using a statically configured path. That is, the same path is used for each frame of the same VL. In some embodiments, the statically configured path is determined using the shortest path algorithm or based on the path having the fewest number of hops. For example, in some embodiments, a Floyd-Warshall algorithm known to one of skill in the art is used.

Temporal Partitioning Capabilities

Figure 4:
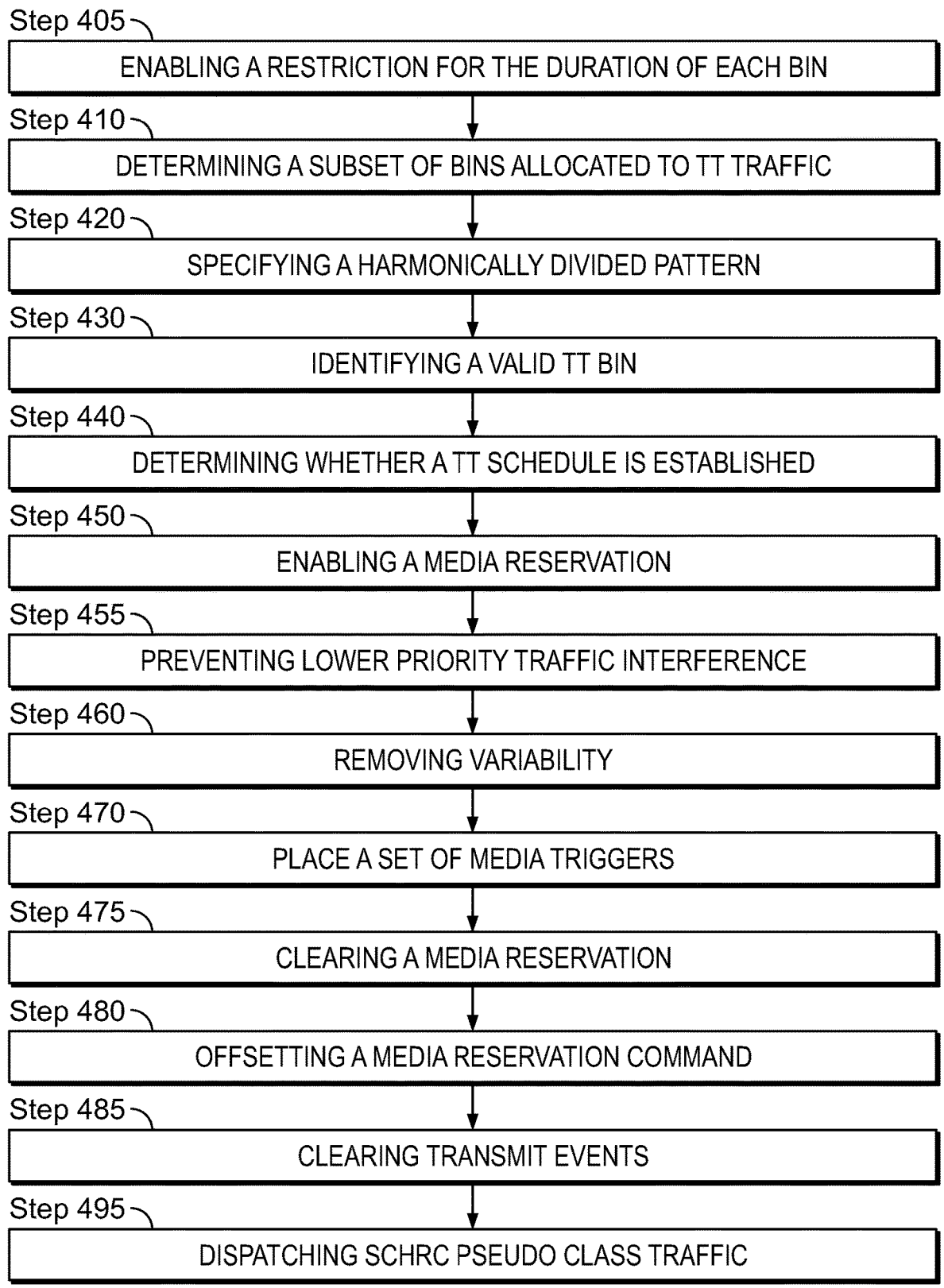
FIG. 4 illustrates an exemplary flow diagram that introduces additional data flows and functionality to temporally partition TT traffic from the remainder of the traffic on the network using media reservations by NST implementation of the scheduling algorithm, in accordance with an embodiment.

FIG. 4 illustrates an exemplary flow diagram of enabling data flows and functionality to temporally partition TT traffic from the remainder of the traffic on the network of the scheduling algorithm in accordance with an exemplary embodiment.

In FIG. 4, the flow diagram at step 405 enables a restriction for the duration of each bin with an equivalent rate that equates to a determined rate of at least twice the rate found of any TT rate traffic in the TTE system. At step 410, an input to the scheduling algorithm determines the subset of bins allocated exclusively to TT traffic based on the global network timeline, which has already been divided into bins. At step 420, the bins available to TT traffic are specified in any harmonically subdivided pattern with the enabled rate restriction, which is configured because of a necessity required to control the media reservations. By this process, the controllable percentage of a bin's time is committed to only TT traffic. This enables configured systems to operate at lower rates, which may be required to connect to end system devices operate at like rates (e.g., devices with 10 Mbps or 100 Mbps connections).

At step 430, the NST 300 checks to determine whether a selected bin using a specified bin selection approach is identified as a valid TT bin. If not, the bin is immediately skipped, and the next bin is returned by the bin selection approach for examination. The process at step 430 continues until a valid bin is found for the TT VL.

At step 440, the NST determines whether the TT schedule has been established. If the TT schedule is established, then at step 445, the scheduling algorithm configures all TTE-capable network devices to activate a media reservation feature. At step 450, once the media reservation feature is enabled in all available enable able network devices, the media reservation feature restricts runtime egress packet processing to a select set of packets configured with traffic priority levels greater than or at least equal to the TT traffic priority level. At step 455, the lower-priority traffic is prevented from interfering with the TT packet's network transit in the TTE network. At step 460, the time (variability time) that has been allotted before in the TTE network configuration for variability is removed because the variability allotted time is no longer required in the TT traffic transit operations. The TTE network no longer contains any interference that can be created by the transit of TT traffic at a different priority level. The variability introduced by shuffle times is removed completely or almost completely from the "dead band" time that has been allocated to the VL. Because no interference takes place with the synchronization PCF traffic on the TTE network while TT traffic is flowing through the TTE network, another source of variability which is contained in the network is also removed, and the TT traffic within the assigned TT bins can also be spaced more closely together in the global schedule (both devoid of any variability because of interference). At step 470, the media reservation triggers are placed by the NST one full shuffle time prior to the beginning of each TT bin or contiguous set of TT bins. At step 475, the media reservation is configured by the NST to be cleared the at the end of each TT bin or contiguous set of TT bins.

In various exemplary embodiments, at step 480, the NST is configured to offset the media reservation commands on egress switch ports to take advantage of serialization delays from transmitting end systems. At step 485, the NST clears the media reservation on client end system devices after the completion of all TT transmit events instead of waiting until the end of the contiguous set of TT bins or other sub-bin timing optimizations.

In various exemplary embodiments, at step 495, the NST enables dispatch of the Scheduled Rate Constrained (SCHRC) pseudo-class of traffic from end systems or switches using synchronized schedule triggers but treats this SCHRC pseudo-class of traffic as RC traffic at a first switch hop ingress as well as all subsequent hops and the receiving end system. The time partitioning algorithm takes into account the valid TT bins and schedules all SCHRC traffic with the other RC traffic flows.

Figure 5:
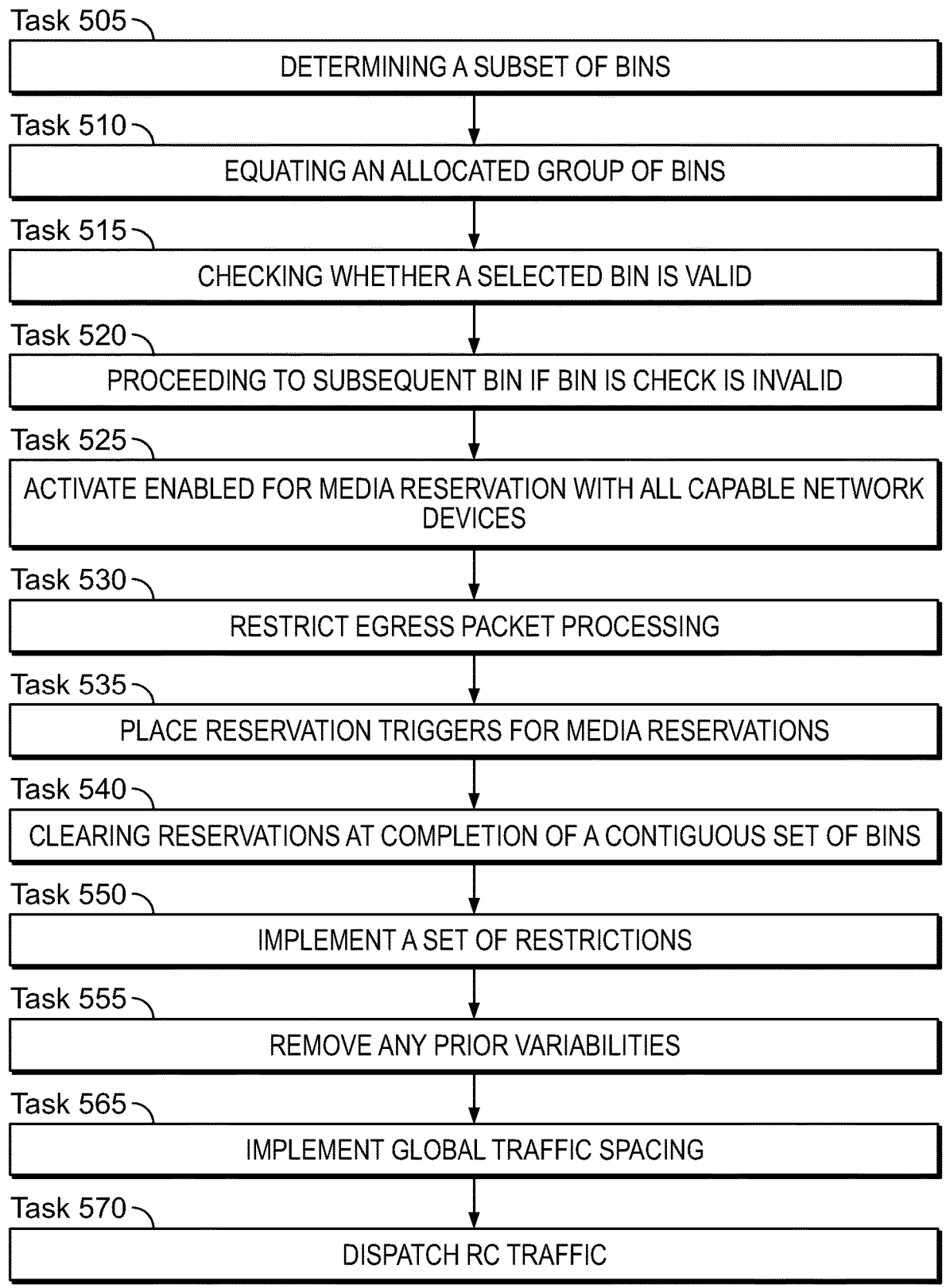
FIG. 5 illustrates another exemplary flow diagram that introduces additional data flows and functionality to temporally partition TT traffic from the remainder of the traffic on the network using media reservations by NST implementation of the scheduling algorithm, in accordance with an embodiment.

FIG. 5 is an exemplary flowchart of the additional data flows and functionality to temporally partition TT traffic from the remainder of the traffic on the network of the scheduling of Virtual Links (VLs) contained in a Time-Triggered Ethernet (TTE) network by a Network Scheduling Tool (NST), in accordance with an embodiment.

In FIG. 5, at task 505, the NST determines a subset of a group of bins allocated to TT traffic. The TT traffic is restricted in a specified harmonically subdivided pattern with a certain duration. At task 510, the NST equates the allocated group of bins to a rate which is restricted to a rate that is at least twice as high as the highest TT traffic rate to enable controlling of media reservations. At task 515, the NST checks whether a bin selected for the TT VL via a bin selection process is a valid TT bin; else, task 520 proceeds to a subsequent bin until a valid TT bin is returned for the TT VL. At task 525, the NST configures by the scheduling algorithm, with the TT schedule established, approximately all TTE capable network devices to activate a media reservation. The media reservation at task 530 restricts runtime egress packet processing to packets with a priority greater than or equal to a TT priority.

At task 535, the NST places triggers for the media reservation approximately one full shuffle time period before each TT bin's commence time. At task 540, the NST clears the media reservation at the end or completion of each TT bin or the completion of a contiguous set of TT bins. At task 550, the NST prevents via restrictions, lower priority traffic from interfering in network transit of higher priority traffic or other TT packets. At task 555, the NST removes prior configured variabilities in the TTE network, introduced by the dead-band time allocated to a VL. At task 565, because other sources of variability have been removed via restrictions implemented by the NST and/or dead time between VLs in assigned bins, the NST allows TT traffic to be spaced closely together in a global schedule. At task 570, The NST dispatches scheduled rate constrained (SCHRC) pseudo-class of traffic dispatch from end systems or switches using synchronized schedule triggers outside of TT bins and treatment as RC traffic an initial switch hop ingress and also subsequent hops to a receiving end system.

Figure 6:
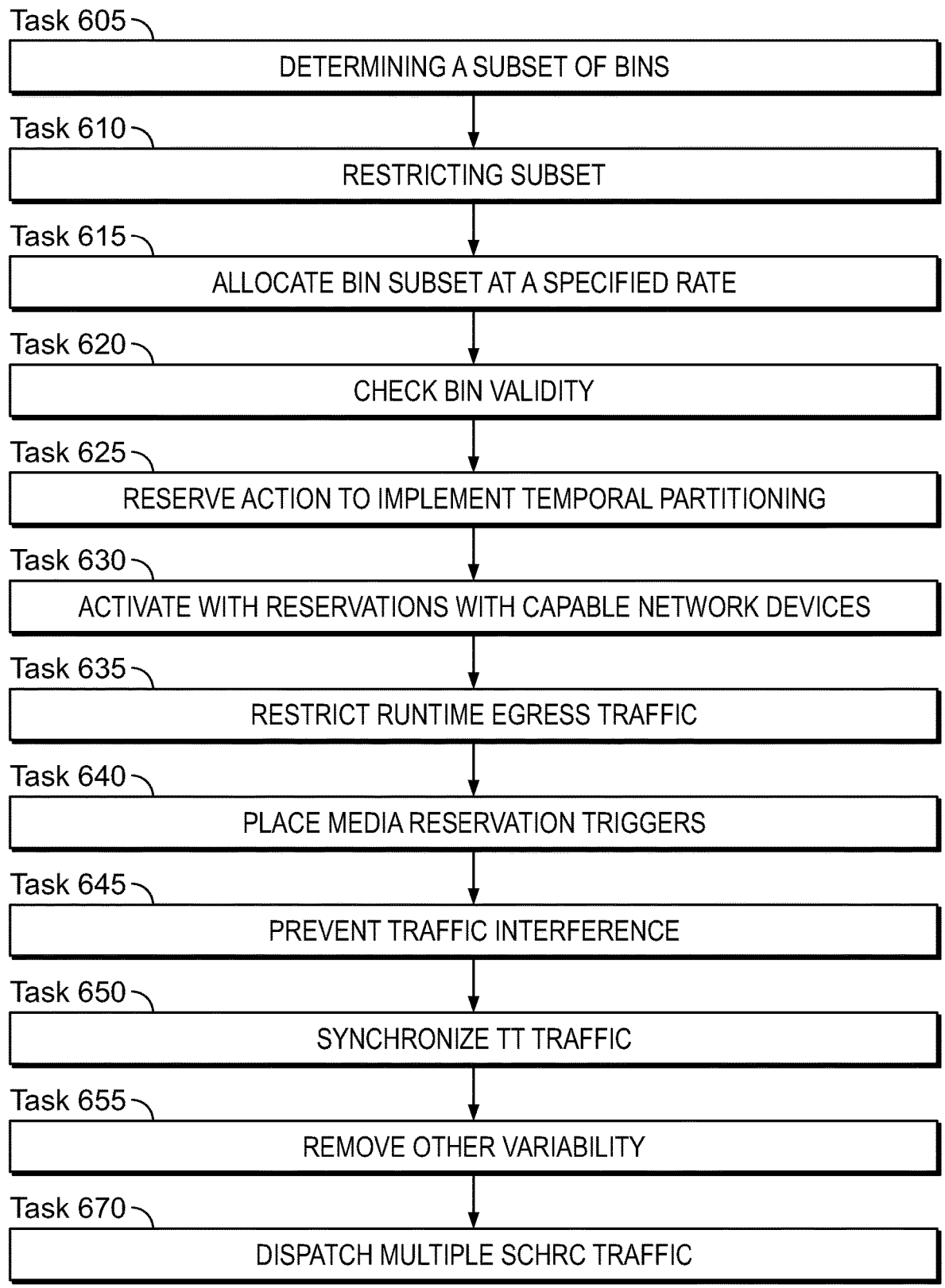
FIG. 6 illustrates yet another exemplary flow diagram that introduces additional data flows and functionality to temporally partition TT traffic from the remainder of the traffic on the network using media reservations by NST implementation of the scheduling algorithm, in accordance with an exemplary embodiment.

FIG. 6 is an exemplary flowchart of the additional data flows and functionality to temporally partition TT traffic from the remainder of the traffic on the network of the scheduling of Virtual Links (VLs) contained in a Time-Triggered Ethernet (TTE) network by a Network Scheduling Tool (NST), in accordance with an embodiment. At task 605, the NST is configured to determine a subset of a group of bins allocated to TT traffic. At task 610, the NST is configured to restrict the subset of the group of bins to a specified harmonic subdivided pattern with a certain duration. At task 615, the NST is configured to allocate the subset of groups of bins specified to a restricted rate. The allocated subset of bin groups is equated in accordance with a rate at least twice as high as a highest TT traffic rate available in the network to enable control of partitioned traffic in the allocated subset of bin groups using a set of media reservations. At step 620, the NST determines if a check of whether a bin selected from bin groups within a VL's scheduling constraints is a valid TT bin; if not then proceeds to a subsequent bin until a valid TT bin is returned by the bin selection algorithm. At task 625, the NST is configured to reserve using at least one media reservation for a valid TT bin. At task 630, the NST is configured to activate the media reservation to approximately all or all TTE capable network devices. At task 635, the NST restricts via egress filtering using multiple media reservations, the runtime egress traffic of a higher priority in transit in the network with a plurality of TT traffic in transit of a lower priority.

At task 640, the NST is configured to place a trigger for a media reservation approximately one full shuffle time period prior to the beginning of each valid TT bin to be scheduled or a contiguous set of valid TT bins to be scheduled. The media reservation is cleared at the end of each valid TT bin or at the end of the contiguous set of valid TT bins. At task 645, the NST is configured to prevent lower priority traffic from interference in network transit of TT traffic by a set of media reservations and remove variability introduced by dead-band time, which had been previously allocated to a VL to be scheduled. At task 650, the NST is configured to assign TT bins to be scheduled without shuffle time interference assumptions by implementing a globally synchronized schedule for TT traffic using protocol control frames (PCF). At task 655, the NST is configured to remove other variability caused by lower-priority packet interference, allowing TT traffic in transit to be spaced closely together in the global schedule. At task 670, the NST is configured to dispatch multiple scheduled rate constrained (SCHRC) packets in a pseudo-class of traffic from end systems and switches in the network using a set of synchronized schedule triggers for a set of multiple media reservations to process the SCHRC pseudo-class of traffic contained outside of TT bins in the network. The plurality of SCHRC pseudo-class of traffic is treated as Rate Constrained (RC) traffic at an initial switch hop ingress, and subsequent switch hops in transit to a receiving end system.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic devices, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc., simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method for scheduling Time-Triggered (TT) traffic by a Network Scheduling Tool (NST) in a TT Ethernet (TTE) network, the method comprising:
   determining, by the NST, a subset of a group of bins allocated to TT traffic wherein the TT traffic is restricted in a specified harmonically subdivided pattern with a certain duration;
   equating, by the NST, an allocated group of bins to a rate which is restricted to the rate that is at least twice as high as a highest TT traffic rate to enable controlling of media reservations;
   checking, by the NST, whether a bin selected for a TT virtual link (VL) via a bin selection process is a valid TT bin, else proceeding to a subsequent bin until a valid TT bin is returned for the TT VL;
   preventing, by the NST, lower priority traffic from interference in network transit of the TT traffic by a set of media reservations;
   removing, by the NST, variability introduced by deadband time that had been previously allocated to a VL to be scheduled; and
   in response to a TT schedule established by selection of valid TT VLs, configuring by the NST by a scheduling algorithm, approximately all TTE capable network devices to activate a media reservation wherein the media reservation restricts runtime egress packet processing to packets with a priority greater than or equal to a TT priority.

2. The method of claim 1, further comprising:
   placing, by the NST, at least one trigger for at least one media reservation approximately one full shuffle time period prior to a beginning of each valid TT bin to be scheduled wherein at least one media reservation is cleared at an end of each valid TT bin.

3. The method of claim 1, further comprising:
   placing, by the NST, at least one trigger for a media reservation approximately one full shuffle time period prior to the beginning of each valid TT bin to be scheduled wherein the media reservation is cleared at the last transmit of a TT VL in each valid TT bin.

4. The method of claim 1, further comprising:
   placing, by the NST, at least one trigger for a media reservation approximately one full shuffle time period prior to the beginning of a contiguous set of valid TT bins wherein the media reservation is cleared at an end of the contiguous set of valid TT bins.

5. The method of claim 1, further comprising:
   placing, by the NST, at least one trigger for a media reservation approximately one full shuffle time period prior to the beginning of a contiguous set of valid TT bins wherein the media reservation is cleared at a last transmit of a TT VL in the contiguous set of valid TT bins.

6. The method of claim 1, further comprising:
   assigning, by the NST, TT bins to be scheduled without shuffle time for interference with synchronization protocol control frames (PCFs) being active while TT traffic navigates the network.

7. The method of claim 6, further comprising:
   removing, by the NST, other variability caused by allowing lower-priority traffic to traverse the network during the same time that TT traffic is scheduled in a global schedule, thereby allowing TT traffic in transit to be spaced closely together in the global schedule.

8. The method of claim 7, further comprising:
   dispatching, by the NST, a plurality of scheduled rate constrained (SCHRC) packets of a pseudo-class of traffic from end systems and switches in the network using a set of synchronized schedule triggers to process the SCHRC pseudo-class of traffic contained outside of TT bins in the network wherein the plurality of SCHRC pseudo-class of traffic is treated as Rate Constrained (RC) traffic at an initial switch hop ingress and subsequent switch hops in transit to a receiving end system.

9. A system for scheduling a set of Virtual Links (VLs) contained in a Time-Triggered (TT) Ethernet (TTE) network with temporal partitioning by a Network Scheduling Tool (NST), the system comprising:
   the NST configured to:
      determine a subset of a group of bins allocated to TT traffic wherein the TT traffic is restricted in a specified harmonically subdivided pattern with a certain duration;
      equate an allocated group of bins to a rate which is restricted to the rate that is at least twice as high as a highest TT traffic rate to enable controlling of media reservations;
      check whether a bin selected for the TT VL via a bin selection process is a valid TT bin, else proceeding to a subsequent bin until a valid TT bin is returned for the TT VL; and
      in response to a TT schedule established by selection of a set of valid TT VLs, activate approximately all TTE capable network devices with a media reservation wherein the media reservation restricts runtime egress packets in transit to a set of runtime egress packets with a priority higher than or equal to a TT priority of the network.

10. The system of claim 9, further comprising:
    the NST further configured to:
       place at least one trigger for a media reservation approximately one full shuffle time period prior to a beginning of each TT bin, wherein the media reservation is cleared at an end of each TT bin.

11. The system of claim 9, further comprising:
the NST further configured to:
place at least one trigger for a media reservation approximately one full shuffle time period prior to a beginning of each TT bin, wherein the media reservation is cleared at the last TT VL transmit of each TT bin.

12. The system of claim 9, further comprising:
the NST further configured to:
place at least one trigger for a media reservation approximately one full shuffle time period prior to a contiguous set of TT bins wherein the media reservation is cleared at an end of the contiguous set of TT bins.

13. The system of claim 9, further comprising:
the NST further configured to:
place at least one trigger for a media reservation approximately one full shuffle time period prior to a contiguous set of TT bins wherein the media reservation is cleared at the last TT VL transmit of the contiguous set of TT bins.

14. The system of claim 13, further comprising:
the NST further configured to:
prevent lower priority traffic from interfering with TT transmissions by placing at least one media reservation of a TT bin approximately one full shuffle time period prior to a start of each TT bin.

15. The system of claim 14, further comprising:
the NST further configured to:
remove variability that has been introduced by dead-band time allocated to a VL to be scheduled in the network; and
assign a set of TT bins to be scheduled without shuffle time for interference with synchronization protocol control frames (PCFs) being active while TT traffic navigates the network.

16. The system of claim 15, further comprising:
the NST further configured to:
dispatch scheduled rate constrained (SCHRC) packets of a pseudo-class of traffic dispatched from end systems and switches using synchronized schedule triggers placed outside of TT bins and by treatment of SCHRC pseudo-class of traffic as RC traffic at an initial switch hop ingress and at subsequent switch hops on route to a receiving end system.

17. An apparatus comprising a network scheduling tool (NST) for scheduling of Virtual Links (VLs) contained in a Time-Triggered Ethernet (TTE) network for use by a Network Scheduling Tool (NST), comprising:
the NST configured with a processor programmed by a set of instructions to schedule time-triggered traffic by:
determining a subset of a group of bins allocated to Time-Triggered (TT) traffic wherein the TT traffic is restricted in a specified harmonically subdivided pattern with a certain duration;
equating an allocated group of bins to a rate which is restricted to the rate that is at least twice as high as a highest TT traffic rate to enable controlling of media reservations;
checking whether a bin selected for a TT virtual link (VL) via a bin selection process is a valid TT bin, else proceeding to a subsequent bin until a valid TT bin is returned for the TT VL;
preventing lower priority traffic from interference in network transit of TT traffic by a set of media reservations;
removing variability introduced by dead-band time that had been previously allocated to a VL to be scheduled; and
in response to a TT schedule established by selection of valid TT VLs, configuring by the NST by a scheduling algorithm, approximately all TTE capable network devices to activate a media reservation wherein the media reservation restricts runtime egress packet processing to packets with a priority greater than or equal to a TT priority.

18. The apparatus of claim 17, further comprising:
the NST configured with the processor programmed by the set of instructions to schedule time-triggered traffic by:
placing at least one trigger for a media reservation approximately one full shuffle time period prior to a beginning of each TT bin or contiguous set of TT bins wherein the media reservation is cleared at an end of each TT bin or the contiguous set of TT bins.

* * * * *